United States Patent
Tachifuji et al.

(10) Patent No.: US 6,555,611 B2
(45) Date of Patent: Apr. 29, 2003

(54) ADSORBENT FOR AROMATIC HYDROXY COMPOUND AND UTILIZATION THEREOF

(75) Inventors: Tomoko Tachifuji, Sakaide (JP); Akira Okada, Sakaide (JP)

(73) Assignee: Kyowa Chemical Industry Co Ltd., Kagawa (JP)

( * ) Notice: Subject to any disclaimer, the term of this patent is extended or adjusted under 35 U.S.C. 154(b) by 87 days.

(21) Appl. No.: 09/959,697

(22) PCT Filed: Mar. 13, 2001

(86) PCT No.: PCT/JP01/01958

§ 371 (c)(1),
(2), (4) Date: Nov. 5, 2001

(87) PCT Pub. No.: WO01/68242

PCT Pub. Date: Sep. 20, 2001

(65) Prior Publication Data

US 2002/0193491 A1 Dec. 19, 2002

(30) Foreign Application Priority Data

Mar. 14, 2000 (JP) ........................................ 2000-070301

(51) Int. Cl.⁷ .............................. C08J 3/00; C08K 3/00; C08K 3/34; C08L 61/06; C01F 7/02
(52) U.S. Cl. ........................ 524/451; 423/600; 524/401; 524/436; 524/437; 524/441; 524/444
(58) Field of Search .................................. 524/451, 444, 524/401, 436, 437, 441; 423/600

(56) References Cited

U.S. PATENT DOCUMENTS

| | | |
|---|---|---|
| 4,458,030 A | 7/1984 | Manabe et al. |
| 4,547,620 A | 10/1985 | Miyata et al. |
| 5,378,367 A | 1/1995 | O'Neill et al. |

FOREIGN PATENT DOCUMENTS

| | | |
|---|---|---|
| JP | 48-33660 | 5/1973 |
| JP | 51-6040 | 2/1976 |
| JP | 53-5633 | 3/1978 |
| JP | 5-38493 | 2/1993 |
| JP | 7-62215 | 3/1995 |
| JP | 11-286899 | 10/1999 |
| JP | 2000-24658 | 1/2000 |

OTHER PUBLICATIONS

Ulibarri, et al., "Hydrotalcite–like compounds . . . ", Applied Clay Science 10 (1995) pp. 131–145.

Primary Examiner—Patrick D. Niland
(74) Attorney, Agent, or Firm—Sherman & Shalloway

(57) ABSTRACT

An adsorbent to an aromatic hydroxy compound, which comprises composite metal oxide solid solution particles of the following formula (1) or hydrotalcite-like composite metal hydroxide particles of the following formula (2), and a method of removing an aromatic hydroxy compound in a solvent by using the adsorbent.

$$(Mg_{y1}M^{2+}{}_{y2})_{1-x}Al_xO_{1+0.5x} \quad (1)$$

$$(Mg_{y1}M^{2+}{}_{y2})_{1-z}Al_z(OH)_{2+a}(A^{n-})_b \cdot mH_2O \quad (2)$$

Provided according to the present invention is an adsorbent capable of efficiently removing an aromatic hydroxy compound from an aqueous solvent or an organic solvent containing an aromatic hydroxy compound.

5 Claims, No Drawings

ADSORBENT FOR AROMATIC HYDROXY COMPOUND AND UTILIZATION THEREOF

DETAILED DESCRIPTION OF THE INVENTION

1. Field of the Invention

The present invention relates to an adsorbent to an aromatic hydroxy compound and a method of removing an aromatic hydroxy compound from a liquid medium containing an aromatic hydroxy compound by adsorption.

2. Prior Art of the Invention

Metal oxide particles and metal hydroxide particles such as magnesium oxide particles, aluminum hydroxide particles and hydrotalcite compound particles are nowadays used as an adsorbent to a variety of acids and alkalis. However, these metal oxide particles or metal hydroxide particles exhibit no capability of adsorption to an aromatic hydroxy compound or an amine compound, or their adsorptive capability is poor.

Of aromatic hydroxy compounds, a bisphenol compound typified by bisphenol A is not only used as a raw material for polymers such as a polycarbonate resin and an epoxy resin, but also used for a plastic polyester, an antioxidant and a vinyl chloride resin stability, and it is assumed that a worldwide output thereof exceeds approximately 1.70 million tons.

In recent years, however, it has been clearly shown that an aromatic hydroxy compound such as bisphenol A eluted from the above resins works as an endocrine disrupter to cause greatly detrimental effects on the human body and an ecosystem. Under the circumstances, investigations of rivers and underground waters have proceeded, and a government agency has reported that rivers and ground waters in many areas are contaminated with aromatic hydroxy compounds. There is another report that an aromatic hydroxy compound has been detected in tap water.

However, no report has been found at present concerning a method, an adsorbent, etc., for effectively removing the above eluted aromatic hydroxy compounds from an organic solvent.

Problems to be Solved by the Invention

It is an object of the present invention to provide an adsorbent capable of effectively removing an aromatic hydroxy compound from a water or an organic solvent containing an aromatic hydroxy compound and a use thereof.

Means to Solve the Problem

According to the present invention, there is provided adsorbents to an aromatic hydroxy compound, the adsorbent comprising composite metal oxide solid solution particles of the following formula (1) or hydrotalcite-like composite metal hydroxide particles of the following formula (2).

$$(Mg_{y1}M^{2+}{}_{y2})_{1-x}Al_xO_{1+0.5x} \quad (1)$$

$$(Mg_{y1}M^{2+}{}_{y2})_{1-z}Al_z(OH)_{2+a}(A^{n-})_b \cdot mH_2O \quad (2)$$

wherein $M^{2+}$ is divalent metal ion or ions of $Zn^{2+}$ and/or $Ca^{2+}$, $A^{n-}$ is an anion having a valence of n, and $y_1$, $y_2$, x, z, a, b and m satisfy the following conditions.

$y_1+y_2=1$ $0<y_1\leq 1$ $0.1<x<0.5$ $0.1<z<0.5$ $z=a+nb$ $a>0.1z$ $0\leq b<z/n$ $0\leq m<2$ According to the present invention, further, there is provided a method of removing an aromatic hydroxy compound in an aqueous solvent or organic solvent containing an aromatic hydroxy compound, which comprises bringing the above solvent and the adsorbent of the present invention into contact with each other to allow the adsorbent to adsorb the aromatic hydroxy compound.

The present invention will be explained in detail hereinafter.

While the mechanism of adsorption of the above adsorbent to an aromatic hydroxy compound is not clear, the present inventors' assumption is that the adsorption is ion exchanging depend on a difference between the dissociation constant of an aromatic hydroxy compound and the counterpart of the adsorbent as will be explained below.

For developing a selective adsorbent to an aromatic hydroxy compound, first, the present inventors paid attention to a height of dissociation constant (pKa) of an aromatic hydroxy compound. A typically known hydrotalcite compound of the following formula (3) generally contains, as an anion ($A^{n-}$), a fixed amount or more of at least one anion selected from the group consisting of $CO_3^{2-}$, $SO_4^{2-}$, $Cl^-$, $NO_3^-$ and $CH_3COO^-$. The typical hydrotalcite compound of the formula (3) is a considerably strong acid due to a conjugated acid based on the anion as compared with an aromatic hydroxy compound. It is therefore assumed that there is a difficulty in an aromatic hydroxy compound undergoing dissociation to ion-exchange with an anion ($A^{n-}$) of the hydrotalcite compound (In fact, this assumption is also considered correct on the basis of Comparative Examples 1 and 2 to be described later).

$$(M^{2+})_{1-x}Al_x(OH)_2(A^{n-})_{x/n} \cdot mH_2O \quad (3)$$

wherein $M^{2+}$ is divalent metal ion or ions of $Mg^{2+}$ and/or $Zn^{2+}$, $An^-$ is an anion having a valence of n and at least one member selected from the group consisting of $CO_3^{2-}$, $SO_4^{2-}$, $Cl^-$, $NO_3^-$ and $CH_3COO^-$, x satisfies $0.1<x<0.5$, and m is a positive number.

Further, it is also presumably because carbon dioxide gas is adsorbed on the crystal surface of each particle of the hydrotalcite compound of the above formula (3) that the typical hydrotalcite compound particles cannot adsorb an aromatic hydroxy compound.

For removing the anion as many as possible that inhibits the adsorption to an aromatic hydroxy compound, therefore, the present inventors have paid attention to composite metal oxide solid solution particles of the following formula (1), which are obtained by calcining the hydrotalcite compound particles of the formula (3).

$$(Mg_{y1}M^{2+}{}_{y2})_{1-x}Al_xO_{1-0.5x} \quad (1)$$

wherein $M^{2+}$ is divalent metal ion or ions of $Zn^{2+}$ and/or $Ca^{2+}$, and $y_1$, $y_2$ and x satisfy the following conditions.

$y_1+y_2=1$ $0<y_1\leq 1$ (preferably $0.5<y_1\leq 1$)

$0.1<x<0.5$ (preferably $0.2\leq x\leq 0.4$)

When the composite metal oxide solid solution particles of the above formula (1) were brought into contact with an aqueous or organic solvent containing an aromatic hydroxy compound, it was found that the aromatic hydroxy compound is efficiently adsorbed to the above solid solution particles.

The present inventors have also found that particles of a hydrotalcite-like composite metal hydroxide of the following formula (2), obtained by hydrating the composite metal oxide solid solution particles of the above formula (1), have excellent capability of adsorption to an aromatic hydroxy compound as well.

$$(Mg_{y1}M^{2+}_{y2})_{1-z}Al_z(OH)_{2+a}(A^{n-})_b \cdot mH_2O \quad (2)$$

wherein $M^{2+}$, $y_1$ and $y_2$ are as defined in the above formula (1), $A^{n-}$ is an anion having a valence of n, preferably at least one anion selected from the group consisting of $CO_3^{2-}$, $SO_4^{2-}$, $Cl^-$, $NO_3^-$ and $CH_3COO^-$, and z, a, b and m satisfy the following conditions.

$0.1 < z < 0.5$ (preferably $0.2 \leq z \leq 0.4$)

$z = a + nb$ $a > 0.1z$ (preferably $a > 0.5z$)

$0 \leq b \leq z/n$ (preferably $0 \leq b < 0.5z/n$)

$0 \leq m < 2$ (preferably $0 \leq m \leq 1$)

The hydrotalcite-like composite metal hydroxide particles of the above formula (2) are a compound of which the anion ($A^{n-}$) content is decreased to a considerable extent in view of its chemical formula as compared with the hydrotalcite compound of the above formula (3).

Advantageously, the adsorbent comprising particles of the compound of the above formula (1) or (2), provided by the present invention, has a BET specific surface area in the range of from 10 to 250 m²/g, preferably from 20 to 220 m²/g. When the specific surface area is large, the filtering rate of the adsorbent after adsorption tends to decrease. However, a decrease in the filtering rate can be overcome when the adsorbent is formed by granulation of a powder.

The composite metal oxide solid solution particles of the formula (1) in the present invention can be produced, for example, by calcining the hydrotalcite compound of the above formula (3), particularly, a hydrotalcite compound whose anion ($A^{n-}$) is carbonate anion ($CO_3^{2-}$) at a temperature of 400 to 900° C. When the calcining is carried out at a temperature higher than the above upper limit, the adsorptive capability of obtained composite metal oxide solid solution particles is low, and further, when the hydrotalcite-like composite metal hydroxide particles of the formula (2) are produced by hydrating a solid solution thereof, a reaction therefor sometimes does not proceed smoothly.

The hydrotalcite-like composite metal hydroxide particles of the formula (2) can be produced by calcining the hydrotalcite compound particles of the formula (3) at 400 to 900° C. as described above to obtain the composite metal oxide solid solution particles of the formula (1) and then hydrating the obtained particles in water. Further, the above particles can be also synthesized according to a method described in JP-B-51-6040. In the production of the hydrotalcite-like composite metal hydroxide particles of the formula (2), preferably, the content of carbonic acid or carbon dioxide gas in the reaction system therefor is decreased so that the content thereof is as less as possible. The reason is that carbonate ion as an anion is included in the structure of the hydrotalcite-like composite metal hydroxide particles or that $CO_2$ is adsorbed on a crystal surface so that the adsorptive capability is degraded.

Since, however, the hydrotalcite-like composite metal hydroxide particles have high capability of adsorption to phenols, other anion does not cause any special problem so long as the hydrotalcite-like composite metal hydroxide particles themselves are contained.

After calcining, preferably, the metal composite oxide solid solution particles that constitute the adsorbent of the present invention are similarly stored such that surface adsorption to carbon dioxide gas does not proceed.

Particles of the adsorbent of the present invention can be used in various forms for adsorption. That is, when these adsorbent particles are prepared by the above calcining or hydration, generally, they are obtained in the form of a fine powder or a spherical powder having an average particle diameter of 30 to 200 μm. These powders can be used as an adsorbent as they are. Further, they can be used as an adsorbent having the form of granules or pellets having an average diameter of 0.7 to 3 mm by granulating the above particles. Further, the adsorbent can be used in the thus-obtained form, or a solvent containing an aromatic hydroxy compound may be flowed through a column charged with the adsorbent.

The adsorbent of the present invention comprises the above composite metal oxide solid solution particles or the above hydrotalcite-like composite metal hydroxide particles, and it may be formed of these particles per se or may be formed by granulating the particles with a binder. The adsorbent contains at least 50% by weight, preferably at least 70% by weight, particularly preferably at least 80% by weight of the above particles.

According to the present inventors' finding, the hydrotalcite-like composite metal hydroxide particles of the formula (2) are more preferred than the composite metal oxide solid solution particles of the formula (1) for removing an aromatic hydroxy compound from an organic solvent containing an aromatic hydroxy compound by adsorption. In the composite metal oxide solid solution particles of the formula (1), the concentration of an aromatic hydroxy compound contained in an organic solvent can be decreased to approximately 10 ppm by increasing the amount thereof. However, it is difficult to remove the aromatic hydroxy compound by adsorption when the concentration thereof comes to be smaller or several ppm. In contrast, the hydrotalcite-like composite metal hydroxide particles of the formula (2) can nearly completely remove an aromatic hydroxy compound in an organic solvent by adsorption by using them in a small amount as compared with the composite metal oxide solid solution particles of the formula (1).

However, when the solvent containing an aromatic hydroxy compound is an aqueous solvent, part of the composite metal oxide solid solution particles are hydrated during a contact adsorption reaction to be converted to hydrotalcite-like composite metal hydroxide particles, so that an aromatic hydroxy compound can be completely removed by adsorption even in case that the composite metal oxide solid solution particles are used.

According to the present invention, therefore, the method of removing an aromatic hydroxy compound in a solvent by adsorption includes the following methods (a) and (b) as preferred embodiments.

(a) A method of removing an aromatic hydroxy compound in an aqueous solvent containing an aromatic hydroxy compound, which comprises bringing the aqueous solvent and the adsorbent of the formula (1) or (2) into contact with each other to allow the adsorbent to adsorb the aromatic hydroxy compound.

(b) A method of removing an aromatic hydroxy compound in an organic solvent containing an aromatic hydroxy compound, which comprises bringing the organic solvent and the adsorbent comprising the hydrotalcite-like composite metal hydroxide of the formula (2) into contact with each other to allow the adsorbent to adsorb the aromatic hydroxy compound.

The aromatic hydroxy compound as an object of adsorption in the present invention is preferably a monohydroxy compound or a dihydroxy compound, and it specifically includes compounds that are used as a raw material or a terminal-blocking agent for the synthesis of a polycarbonate resin, an epoxy resin or a polyester resin. Examples thereof include phenol or bisphenol. These compounds may have substituents such as an alkyl group, a halogen and a nitro group. The bisphenol includes a compound represented by HO—PH—Z—PH—OH (in which PH is a 1,4-phenylene group, and Z is a direct bond, an oxygen atom, a sulfur atom, a sulfoxide group, a sulfone group, an alkylidene group having 30 or less carbon atoms, an alkylene group having 30 or less carbon atoms, a cycloalkylidene group having 30 or less carbon atoms, a cycloalkylene group having 30 or less carbon atoms, or a phenyl-sbustituted alkylene group having 30 or less carbon atoms). A typical example of the bisphenol is 2,2-bis(4-hydroxyphenyl)propane (bisphenol A).

In the present invention, examples of the "organic solvent" for the organic solvent containing an aromatic hydroxy compound include (i) lower alcohols such as methanol, ethanol, propanol and butanol, (ii) ethers such as diethyl ether, diisopropyl ether, tetrahydrofuran and dioxolane, (iii) ketones such as acetone, methyl ethyl ketone, methyl isobutyl ketone and acetophenone, (iv) aliphatic hydrocarbons such as hexane, heptane and octane, (v) aromatic hydrocarbons such as benzene, chlorobenzene, toluene and xylene, (vi) esters such as ethyl acetate, propyl acetate and higher fatty acid esters (e.g., glyceride), (vii) nitrogen-containing compounds such as pyridine, N-methylpyrrolidone and dimethylacetamide, and (viii) nitriles such as acetonitrile and propionitrile. The above organic solvents may be used alone or as a mixture in combination of at least two of them. The content of the organic solvent in the entire solvent is at least 60% by weight, preferably at least 80% by weight, particularly preferably at least 90% by weight, and the organic solvent may contain a small amount of water. The aqueous solvent is a solvent whose water content based on the entire solvent is at least 60% by weight, preferably at least 80% by weight, particularly preferably at least 90% by weight, and the aqueous solvent may contain a small amount of an organic solvent.

As a method of removing an aromatic hydroxy compound in a solvent by adsorption by means of the adsorbent of the present invention, there can be used an adsorption method that is generally known per se. For example, there is a method in which the adsorbent is added to a solvent, the mixture is stirred and then the adsorbent is separated with a filter. There may be also employed a method in which the adsorbent is charged into a column and a solvent is flowed through the column. When the column is used, it is preferred to employ a means of preventing a decrease in the adsorption rate caused by adsorption to carbon dioxide gas. That is, for example, there can be employed a method in which particles of the adsorbent are suspended in an organic solvent and immediately charged into the column or a method in which the adsorbent in the form of granules (or pellets) is charged into the column and immediately thereafter an organic solvent is flowed through. There can be also employed a method in which the adsorbent is suspended in a decarboxylated aqueous solvent and immediately charged into the column or a method in which the adsorbent in the form of granules (or pellets) is charged in the column and immediately thereafter a decarboxylated aqueous solvent is flowed through.

In the adsorption procedure, while the temperature particularly is not limited, the adsorption can be carried out generally at a temperature of 0 to 150° C., preferably 20 to 100° C. Generally, as the temperature increases, the processing time decreases.

After the adsorption procedure, the adsorbent that has adsorbed an aromatic hydroxy compound is calcined, for example, at a temperature of 400 to 900° C. and the calcined adsorbent is hydrated as required, whereby the thus-treated adsorbent can be used again as an adsorbent of the present invention.

According to the present invention that has been discussed hereinabove, the separation and recovery of an aromatic hydroxy compound in a solution resulting from the step of producing a synthetic resin from an aromatic hydroxy compound as a raw material can be selectively and effectively carried out.

Having paid attention to excellence of the composite metal oxide particles of the above formula (1) and the hydrotalcite-like composite metal hydroxide particles of the above formula (2) in the property of adsorbing an aromatic hydroxy compound, the present inventors have studied other use. As a result, it has been found that when the adsorbent of the present invention is incorporated into a synthetic resin or paint synthesized from an aromatic hydroxy compound as a raw material, an aromatic hydroxy compound that remains as an unreacted raw material or is generated by decomposition can be effectively adsorbed. That is, it has been found that when the adsorbent of the present invention is incorporated into a synthetic resin or paint containing an aromatic monohydroxy compound, the elution or volatilization of a harmful aromatic hydroxy compound from the synthetic resin or paint is inhibited.

According to the present invention, there is provided a resin composition or coating composition containing a synthetic resin or paint synthesized from an aromatic hydroxy compound as a raw material and the adsorbent of the present invention.

As an adsorbent to be incorporated into the synthetic resin or the paint, an adsorbent comprising the hydrotalcite-like composite metal hydroxide particles of the formula (2) is more preferred than an adsorbent comprising the composite metal oxide particles of the formula (1) in respect of adsorption properties and stability to the resin (or paint). As the above synthetic resin, preferred is a polycarbonate resin or an epoxy resin synthesized from bisphenol A as a raw material. The amount of the adsorbent per 100 parts by weight of the synthetic, resin or paint is 0.01 to 10 parts by weight, preferably 0.05 to 5 parts by weight.

EXAMPLES

The present invention will be specifically explained with reference to Examples hereinafter.

Example 1

Carbonate-anion-possessing hydrotalcite particles having a BET specific surface area of 100 m$^2$/g and represented by a chemical formula of Mg$_{0.7}$Al$_{0.3}$(OH)$_2$(CO$_3$)$_{0.15}$·0.55H$_2$O were calcined at 550° C. for 2 hours, to give composite metal oxide solid solution particles Mg$_{0.7}$Al$_{0.3}$O$_{1.15}$ having a BET specific surface area of 202 m$^2$/g.

Example 2

The composite metal oxide solid solution particles obtained in Example 1 and decarboxylated water having a weight approximately 10 times the weight thereof were placed in a container, and the container was closed and shaken in a constant-temperature chamber at 30° C. overnight, to carry out a rehydrative reaction. The resultant mixture was dehydrated and dried to give hydrotalcite-like composite metal hydroxide particles $Mg_{0.7}Al_{0.3}(OH)_{2.2}(CO_3)_{0.05}.0.65H_2O$ having a BET specific surface area of 32 $m^2/g$. The carbonate ion of the above formula is that which was derived from inclusion of $CO_2$ in air in the process of the dehydration and drying.

Example 3

Carbonate-anion-possessing hydrotalcite particles having a BET specific surface area of 14.5 $m^2/g$ and represented by a chemical formula of $Mg_{0.75}Al_{0.25}(OH)_2(CO_3)_{0.125}.0.5H_2O$ were calcined at 550° C. for 2 hours, to give composite metal oxide solid solution particles $Mg_{0.75}Al_{0.025}O_{1.125}$ having a BET specific surface area of 143 $m^2/g$.

Example 4

The composite metal oxide solid solution particles obtained in Example 3 and decarboxylated water having a weight approximately 10 times the weight thereof were placed in a container, and the container was closed and shaken in a constant-temperature chamber at 30° C. overnight, to carry out a rehydrative reaction. The resultant mixture was dehydrated and dried to give hydrotalcite-like composite metal hydroxide particles $Mg_{0.75}Al_{0.25}(OH)_{2.17}(CO_3)_{0.042}.0.7H_2O$ having a BET specific surface area of 31 $m^2/g$. The carbonate ion of the above formula is that which was derived from inclusion of $CO_2$ in air in the process of the dehydration and drying.

Example 5

Zinc-containing and carbonate-anion-possessing hydrotalcite particles having a BET specific surface area of 9.0 $m^2/g$ and represented by a chemical formula of $Mg_{0.5}Zn_{0.17}Al_{0.33}(OH)_2(CO_3)_{0.165}.0.5H_2O$ were calcined at 550° C. for 2 hours, to give composite metal oxide solid solution particles $Mg_{0.5}Zn_{0.17}Al_{0.33}O_{1.165}$ having a BET specific surface area of 140 $m^2/g$.

Example 6

The composite metal oxide solid solution particles obtained in Example 5 and decarboxylated water having a weight approximately 10 times the weight thereof were placed in a container, and the container was closed and shaken in a constant-temperature chamber at 30° C. overnight, to carry out a rehydrative reaction. The resultant mixture was dehydrated and dried to give Zinc-containing hydrotalcite-like composite metal hydroxide particles $Mg_{0.5}Zn_{0.17}Al_{0.33}(OH)_{2.22}(CO_3)_{0.06}.0.6H_2O$ having a BET specific surface area of 60 $m^2/g$. The carbonate ion of the above formula is that which was derived from inclusion of $CO_2$ in air in the process of the dehydration and drying.

Comparative Example 1

Carbonate-anion-possessing hydrotalcite having a BET specific surface area of 100 $m^2/g$ and represented by a chemical formula of $Mg_{0.7}Al_{0.3}(OH)_2(CO_3)_{0.15}.0.55H_2O$ used as a raw material in Example 1.

Comparative Example 2

Zinc-containing and carbonate-anion-possessing hydrotalcite particles having a BET specific surface area of 9.0 $m^2/g$ and represented by a chemical formula of $Mg_{0.5}Zn_{0.17}Al_{0.33}(OH)_2(CO_3)_{0.165}.0.5H_2O$ used as a raw material in Example 5.

Comparative Example 3

Zinc-type, carbonate-anion-possessing hydrotalcite particles having a BET specific surface area of 8.9 $m^2/g$ and represented by a chemical formula of $Zn_{0.67}Al_{0.33}(OH)_2(CO_3)_{0.165}.0.5H_2O$ were calcined at 550° C. for 2 hours, to give composite metal oxide solid solution particles $Zn_{0.67}Al_{0.33}O_{1.165}$ having a BET specific surface area of 121 $m^2/g$.

Comparative Example 4

The composite metal oxide solid solution particles obtained in Comparative Example 3 and decarboxylated water having a weight approximately 10 times the weight thereof were placed in a container, and the container was closed and shaken in a constant-temperature chamber at 30° C. overnight, to carry out a rehydrative reaction. The resultant mixture was dehydrated and dried to give Zinc-type, hydrotalcite-like composite metal hydroxide particles $Zn_{0.67}Al_{0.33}(OH)_{2.22}(CO_3)_{0.06}.0.6H_2O$ having a BET specific surface area of 35 $m^2/g$. The carbonate ion of the above formula is that which was derived from inclusion of $CO_2$ in air in the process of the dehydration and drying.

Comparative Example 5

Particles having a BET specific surface area of 2.2 $m^2/g$ and a chemical formula of $Ca_{4.76}Al_2(OH)_{13.2}(NO_3)_{1.7}(CO_3)_{0.31}.4.6H_2O$ were used.

Comparative Example 6

Magnesium hydroxide particles having a BET specific surface area of 6.0 $m^2/g$ were calcined at 550° C. for 2 hours, to give magnesium oxide particles having a BET specific surface area of 89 $m^2/g$.

Comparative Example 7

Reagent $Ca(OH)_2$ particles were calcined at 550° C. for 2 hours to give calcium oxide particles having a BET specific surface area of 10 $m^2/g$.

Comparative Example 8

Activated carbon (particulate) supplied by Ishizu Pharmaceutical Co. was pulverized and passed through a 100-mesh screen. The activated carbon had a BET specific surface area of 443 $m^2/g$.

Comparative Example 9

Taiko activated carbon (granular) supplied by Nimura Kagaku KK was used in its original condition. The activated carbon had a BET specific surface area of 449 $m^2/g$.

For evaluating the adsorbents obtained in Examples 1 to 6 and Comparative Examples 1 to 9 for capability of adsorption to an aromatic hydroxy compound, (I) a bisphenol A adsorption test, (II) a phenol adsorption test and (III) a nonylphenol adsorption test that are shown below were carried out.

(I) Bisphenol A Adsorption Test

40 Grams of a solution of 100 ppm or 500 ppm of a bisphenol A (BPA) and 0.4 g of an adsorbent (1 wt % to the bisphenol A solution) were placed in a closure-attached Erlenmeyer flask having a volume of 300 ml and shaken at 120 rpm at 40° C. for 1 hour. Then, the adsorbent was separated by filtering, and a filtrate was measured for absorption around 280 nm (at 280 nm when the solvent was ethanol, or at 277 nm when the solvent was 10 wt % ethanol+90 wt % deionized water) with an absorptionmeter, to determine a bisphenol A concentration. As a bisphenol A solution, there were prepared a solution of bisphenol A in ethanol (organic solvent) and a solution of bisphenol A in 10 wt % ethanol+90 wt % deionized water (aqueous solvent). The following Table 1 shows the results. The adsorptivity in the table shows a percentage (%) of BPA adsorbed to an adsorbent to BPA in a solvent.

TABLE 1

| Adsorbent | Adsorptivity (%) to BPA in organic solvent | | Adsorptivity (%) to BPA in aqueous solvent | |
|---|---|---|---|---|
| | Initial concentration of BPA 100 ppm | Initial concentration of BPA 500 ppm | Initial concentration of BPA 100 ppm | Initial concentration of BPA 500 ppm |
| Ex. 1 | 36.8 | 17.7 | 100 | 100 |
| Ex. 2 | 100 | 87.8 | 100 | 73.4 |
| Ex. 3 | 13.3 | 5.9 | 100 | 100 |
| Ex. 4 | 91.3 | 88.7 | 96.4 | 80.6 |
| Ex. 5 | 5.9 | 1.7 | 100 | 99.1 |
| Ex. 6 | 78.4 | 48.1 | 98.4 | 67.1 |
| C. Ex. 1 | 0.7 | 0 | 1.3 | 0 |
| C. Ex. 2 | 0 | 0 | 0 | 0 |
| C. Ex. 3 | 0.2 | 0 | 57.2 | 46.2 |
| C. Ex. 4 | 0 | 0 | 39.1 | 19.2 |
| C. Ex. 5 | 0 | 0 | * | * |
| C. Ex. 6 | 8.5 | 8.0 | 41.9 | 67.8 |
| C. Ex. 7 | 24.0 | 10.7 | * | * |
| C. Ex. 8 | 5.5 | 5.3 | 100 | 96.1 |
| C. Ex. 9 | 0 | 0 | 90.9 | 84.3 |

Ex. = Example, C. Ex. = Comparative Example
*A Ca-containing substance forms a water-soluble salt with BPA in an aqueous medium, so that it is not usable for adsorption to BPA.

(II) Phenol (PH) Adsorption Test

A phenol (PH) adsorption test was carried out in the same manner as in the above bisphenol A adsorption test except that the bisphenol A was replaced with phenol and that the wavelength for measurement for an absorbance was changed to 273.5 nm for quantitative determination. Table 2 shows the results.

TABLE 2

| Adsorbent | Adsorptivity (%) to PH in organic solvent | |
|---|---|---|
| | Initial concentration of PH 100 ppm | Initial concentration of PH 500 ppm |
| Ex. 2 | 99.4 | 94.6 |
| C. Ex. 8 | 25.6 | 13.5 |

Ex. = Example, C. Ex. = Comparative Example (III) Nonylphenol (NP) Adsorption Test A nonylphenol (NP) adsorption test was carried out in the same manner as in the above bisphenol A adsorption test except that the bisphenol A was replaced with nonylphenol and that the wavelength for measurement for an absorbance was changed to 277.5 nm for quantitative determination. Table 3 shows the results.

TABLE 3

| Adsorbent | Adsorptivity (%) to NP in organic solvent | |
|---|---|---|
| | Initial concentration of NP 20 ppm | Initial concentration of NP 100 ppm |
| Ex. 1 | 13.3 | 8.2 |
| Ex. 2 | 36.9 | 28.0 |
| C. Ex. 8 | 0 | 4.3 |

Ex. = Example, C. Ex. = Comparative Example (IV) Test of Elution of Bisphenol A from Epoxy Resin For studying an effect on adsorption to bisphenol A in a resin, a sample was prepared by adding a small amount of bisphenol A to a resin during its processing, and the following elution test was carried out.
(1) Preparation of Epoxy Resin Sample

| | Composition | |
|---|---|---|
| Materials | Sample ① (Blank) | Sample ② (Adsorbent added) |
| (a) Epicote 828 | 100 phr | 100 phr |
| (b) Rikacid MH-700 | 80 phr | 80 phr |
| (c) Dimethylbenzylamine | 1 phr | 1 phr |
| (d) Bisphenol A | 0.2 phr | 0.2 phr |
| (e) Adsorbent | — | 1 phr |

Materials
(a) Bisphenol A type epoxy resin (Epicote 828, supplied by Yuka-Shell Epoxy K.K.)
(b) Epoxy curing agent (Rikacid MH-700; Hexahydrophthalic acid anhydride, supplied by Shin-Nippon Rika KK)
(c) Epoxy cure promoter (Dimethylbenzylamine, supplied by Koeikagaku KK)
(d) Bisphenol A (first grade, supplied by Wako-Purechemical Ind. Co., Ltd.)
(e) Adsorbent (Hydrotalcite-like composite metal hydroxide particles of Example 2)

Preparation of Samples

The above composition was stirred at room temperature for 30 minutes and dropped in the form of dots having a diameter of 5 mm each, and the dropped composition was pre-cured (110° C.×2 hours) and post-cured (150° C.×3 hours). 1 Gram of the thus-obtained epoxy resin chips were used as a sample for the elution test.
(2) Elution Test of Bisphenol A 1 Gram of the epoxy resin chips and 10 g of ethanol were placed in a closure-attached Erlenmeyer flask having a volume of 100 ml and the flask was immersed in a constant-temperature vessel set at 40° C. for 5 days. After the 5 days, the flask was lightly shaken, and a supernatant was measured for the bisphenol A with an absorptionmeter. The following Table shows the results.

| | Concentration (ppm) of BPA in supernatant |
|---|---|
| Sample ① | 877.0 |
| Sample ② | 332.1 |

Effect of the Invention

According to the present invention, there can be provided an adsorbent that can efficiently remove an aromatic hydroxy compound by adsorption from an aqueous or organic solvent containing an aromatic hydroxy compound.

Above all, an aromatic hydroxy compound can be effectively removed from an organic solvent completely free of water.

What is claimed is:

1. A method of removing an aromatic hydroxy compound in an aqueous solvent or organic solvent containing an aromatic hydroxy compound, which comprises bringing the solvent containing the aromatic hydroxy compound and an adsorbent into contact with each other to allow the adsorbent to adsorb the aromatic hydroxy compound, the absorbent comprised of hydrotalcite-like composite metal hydroxide particles of formula (2), $$(Mg_{y1}M^{2+}_{y2})_{1-z}Al_z(OH)_{2+a}(A^{n-})_b \cdot mH_2O \tag{2}$$

wherein $M^{2+}$ is divalent metal ion or ions of $Zn^{2+}$ and/or $Ca^{2+}$, $A^{n-}$ is an anion having a valence of n, and $Y_1$, $Y_2$, z, a, b and m satisfy the following conditions, $Y_1+Y_2=1$ $0<y_1 \leq 1$ $0.1<z<0.5$ $z=a+nb$ $a>0.1z$ $0 \leq b<z/n$ $0 \leq m<2$, and wherein the organic solvent is a solvent containing at least 60% by weight of at least one organic solvent selected from the group consisting of a lower alcohol, an ether, a ketone and an aromatic hydrocarbon.

2. A method of removing an aromatic hydroxy compound in an organic solvent containing an aromatic hydroxy compound, which comprises bringing the solvent containing the aromatic hydroxy compound and an adsorbent into contact with each other to allow the adsorbent to adsorb the aromatic hydroxy compound, wherein the absorbent comprises hydrotalcite-like composite metal hydroxide particles of formula (2), $$(Mg_{y1}M^{2+}_{y2})_{1-z}Al_z(OH)_{2+a}(A^{n-})_b \cdot mH_2O \tag{2}$$

wherein $M^{2+}$ is divalent metal ion or ions of $Zn^{2+}$ and/or $Ca^{2+}$, $A^{n-}$ is an anion having a valence of n, and $Y_1$, $Y_2$, z, a, b and m satisfy the following conditions, $Y_1+Y_2=1$ $0<y_1 \leq 1$ $0.1<z<0.5$ $z=a+nb$ $a>0.1z$ $0 \leq b<z/n$ $0 \leq m<2$, and wherein the organic solvent is a solvent containing at least 60% by weight of at least one organic solvent selected from the group consisting of a lower alcohol, an ether, a ketone and an aromatic hydrocarbon.

3. A resin composition or coating composition comprising 100 parts by weight of a synthetic resin or paint synthesized from an aromatic hydroxy compound as a raw material and 0.01 to 10 parts of an adsorbent comprised of hydrotalcite-like composite metal hydroxide particles of formula (2), $$(Mg_{y1}M^{2+}_{y2})_{1-z}Al_z(OH)_{2-a}(A^{n-})_b \cdot mH_2O \tag{2}$$

wherein $M^{2+}$ is divalent metal ion or ions of $Zn^{2+}$ and/or $Ca^{2+}$, $A^{n-}$ is an anion having a valence of n, and $Y_1$, $Y_2$, z, a, b and m satisfy the following conditions, $Y_1+Y_2=1$ $0<y_1 \leq 1$ $0.1<z<0.5$ $z=a+nb$ $a>0.1z$ $0 \leq b<z/n$ $0 \leq m<2$.

4. The resin composition or paint composition of claim 3, wherein the adsorbent is an adsorbent composed of the hydrotalcite-like composite metal hydroxide particles of formula (2).

5. The resin composition of claim 3, wherein the synthetic resin is a polycarbonate resin or epoxy resin synthesized from bisphenol A as a raw material.

* * * * *